United States Patent
Greenberger et al.

(10) Patent No.: US 10,156,845 B1
(45) Date of Patent: Dec. 18, 2018

(54) AUTONOMOUS VEHICLE OPERATION USING ALTERED TRAFFIC REGULATIONS

(71) Applicant: International Business Machines Corporation, Armonk, NY (US)

(72) Inventors: Jeremy A. Greenberger, Raleigh, NC (US); Christopher J. Hardee, Raleigh, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/627,563

(22) Filed: Jun. 20, 2017

(51) Int. Cl.
  *G05D 1/00* (2006.01)
  *G08G 1/09* (2006.01)

(52) U.S. Cl.
  CPC ........... *G05D 1/0088* (2013.01); *G08G 1/093* (2013.01)

(58) Field of Classification Search
  CPC ............................. G05D 1/0088; G08G 1/093
  See application file for complete search history.

(56) References Cited

U.S. PATENT DOCUMENTS

| | | | |
|---|---|---|---|
| 5,369,591 A * | 11/1994 | Broxmeyer | G05D 1/0261 180/167 |
| 6,681,175 B2 | 1/2004 | Macphail et al. | |
| 6,700,504 B1 | 3/2004 | Aslandogan et al. | |
| 8,688,306 B1 | 4/2014 | Nemec et al. | |
| 9,096,267 B2 | 8/2015 | Mudalige et al. | |
| 9,278,689 B1 | 3/2016 | Delp | |
| 9,352,779 B2 | 5/2016 | Kindo et al. | |
| 9,384,666 B1 | 7/2016 | Harvey | |
| 9,557,736 B1 * | 1/2017 | Silver | G06K 9/00812 |
| 10,019,901 B1 * | 7/2018 | Fields | G08G 1/096791 |
| 2009/0322563 A1 * | 12/2009 | Stadtmiller | G08G 1/081 340/909 |
| 2015/0241878 A1 * | 8/2015 | Crombez | G05D 1/0088 701/23 |
| 2016/0127887 A1 | 5/2016 | Ricci | |

(Continued)

OTHER PUBLICATIONS

"When Thinking Machines Break the Law- Schneier on Security", white pages, 2015, p. 1-45.

(Continued)

*Primary Examiner* — Hussein Elchanti
(74) *Attorney, Agent, or Firm* — Cantor Colburn LLP; Kurt Goudy (57) ABSTRACT

Embodiments include method, systems and computer program products for autonomous vehicle operation using altered traffic regulations. The computer-implemented method includes receiving, by a processor, request data that represents a request to use altered traffic regulations. The processor determines a current location of one or more autonomous vehicles associated with the request. The processor determines that an authority associated with the processor governs at least a portion of a road network associated with the request. The processor determines resolution of the request, wherein determining the resolution is based at least in part on a determination that the authority associated with the processor governs the associated portion of the road network associated with the request. The processor generates resolution data representing the resolution and transmits the resolution data.

17 Claims, 6 Drawing Sheets

(56) References Cited

U.S. PATENT DOCUMENTS

2016/0293006 A1* 10/2016 Bauer .................... G08G 1/095
2017/0364069 A1* 12/2017 Colella ................ A61B 5/0022
2018/0011485 A1* 1/2018 Ferren .................. G05D 1/0022
2018/0136655 A1* 5/2018 Kim ........................ B60N 2/002
2018/0186392 A1* 7/2018 Da Costa ................ G08G 7/02

OTHER PUBLICATIONS

Bertonomus, "If you have a fatal heart attack in your self-driving car, would the car just continue on to it's destination? Would dead people just start showing up at weddings/parties/work etc.?" reddit, Jul. 2, 2015, p. 1-9.

Claire Cain Miller, "When Driverless Cars Break the Law" The New York Times, May 13, 2014, p. 1-5.

Josh Newby, "The Future of Autonomous Emergency Response" designmind, frogdesign, 2015, p. 1-8.

Michael Irving, "Should Autonomous Vehicles be programmed to break the law?" New Atlas, Aug. 1, 2016, p. 1-5.

Samantha Hearn, "Self-driving car technologies will develop to fullyautonomous in 30 years" Brentwood Home Page, Jan. 2017, p. 1-4.

Orr Hirschauge, "Are driverless cars safer cars?" Wall Street Journal, Aug. 17, 2017, p. 1-3.

* cited by examiner

AUTONOMOUS VEHICLE OPERATION USING ALTERED TRAFFIC REGULATIONS

BACKGROUND

The present invention relates in general to autonomous vehicle operations, and more specifically, to permitting autonomous vehicles to modify traffic regulations governing operation of the autonomous vehicle based on an event.

Autonomous vehicles are automobiles that have the ability to operate and navigate without human input. Autonomous vehicles use sensors, such as radio detection and ranging (RADAR), light detection and ranging (LIDAR), global positioning systems, and computer vision to detect the vehicle's surroundings. Advanced computer control systems interpret the sensory input information to identify appropriate navigation paths, as well as obstacles and relevant signage. Some autonomous vehicles update map information in real time to remain aware of the autonomous vehicle's location even if conditions change or the vehicle enters an uncharted environment. Autonomous vehicles increasingly communicate with remote computer systems via wireless network connections and with one another using dedicated short-range communications (DSRC).

SUMMARY

Embodiments of the invention are directed to a computer-implemented method for autonomous vehicle operation using altered traffic regulations. A non-limiting example of the computer-implemented method includes receiving, by a processor, request data that represents a request to use altered traffic regulations. The processor determines a current location of one or more autonomous vehicles associated with the request. The processor determines that an authority associated with the processor governs at least a portion of a road network associated with the request. The processor determines a resolution of the request, wherein determining the resolution is based at least in part on a determination that the authority associated with the processor governs the associated portion of the road network associated with the request. The processor generates resolution data representing the resolution and transmits the resolution data.

Embodiments of the invention are directed to a computer program product that includes a storage medium usable by a processing circuit. The storage medium can store instructions for execution by the processing circuit for performing a method for autonomous vehicle operation using altered traffic regulations. A non-limiting example of the method includes receiving request data that represents a request to use altered traffic regulations. The processor determines a current location of one or more autonomous vehicles associated with the request. The processor determines that an authority associated with the processor governs at least a portion of a road network associated with the request. The processor determines a resolution of the request, wherein determining the resolution is based at least in part on a determination that the authority associated with the processor governs the associated portion of the road network associated with the request. The processor generates resolution data representing the resolution and transmits the resolution data.

Embodiments of the invention are directed to a system for autonomous vehicle operation using altered traffic regulations. The system can include a processor and memory controller in communication with one or more types of memory. The processor is configured to perform operations that include receiving request data that represents a request to use altered traffic regulations. A non-limiting example of the operations includes determining a current location of one or more autonomous vehicles associated with the request. A determination is made that an authority associated with the processor governs at least a portion of a road network associated with the request. A determination is also made resolving the request, wherein determining the resolution is based at least in part on a determination that the authority associated with the processor governs the associated portion of the road network associated with the request. The processor is configured to generate resolution data representing the resolution and transmit the resolution data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the present invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): a software distribution model in which a third-party provider hosts applications and makes them available to customers over the Internet. SaaS removes the need for organizations to install and run applications on their own computers or in their own data centers. This eliminates the expense of hardware acquisition, provisioning and maintenance, as well as software licensing, installation and support.

Platform as a Service (PaaS): a cloud-computing model that delivers applications over the Internet. In a PaaS model, a cloud provider delivers hardware and software tools, for example, tools needed for application development, to users as a service. A PaaS provider can host the hardware and software on the PaaS provider's infrastructure. As a result, PaaS frees users from having to install in-house hardware and software to develop or run a new application.

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems may include monitoring engines to track performance and usage, error monitoring, and data analysis engines.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure that includes a network of interconnected nodes.

Turning now to an overview of technologies that are more specifically relevant to aspects of the invention, embodiments of the invention are related in general to autonomous vehicles and the compliance to traffic rules and regulations by the autonomous vehicles. In general, autonomous vehicles have been designed to strictly follow designated traffic rules and regulations issued by a governing authority for a given portion of a road network.

Autonomous driving refers to vehicles in which operation occurs with little to no direct driver input to control the steering, acceleration, and braking. Autonomous vehicles are designed so that the driver is not expected to constantly monitor the roadway during autonomous driving operation. Autonomous vehicles can be based on varying degrees of automation, i.e., conditional automation to full automation. Autonomous vehicles are normally programmed to comply with all regulations for a given region.

Figure 1:
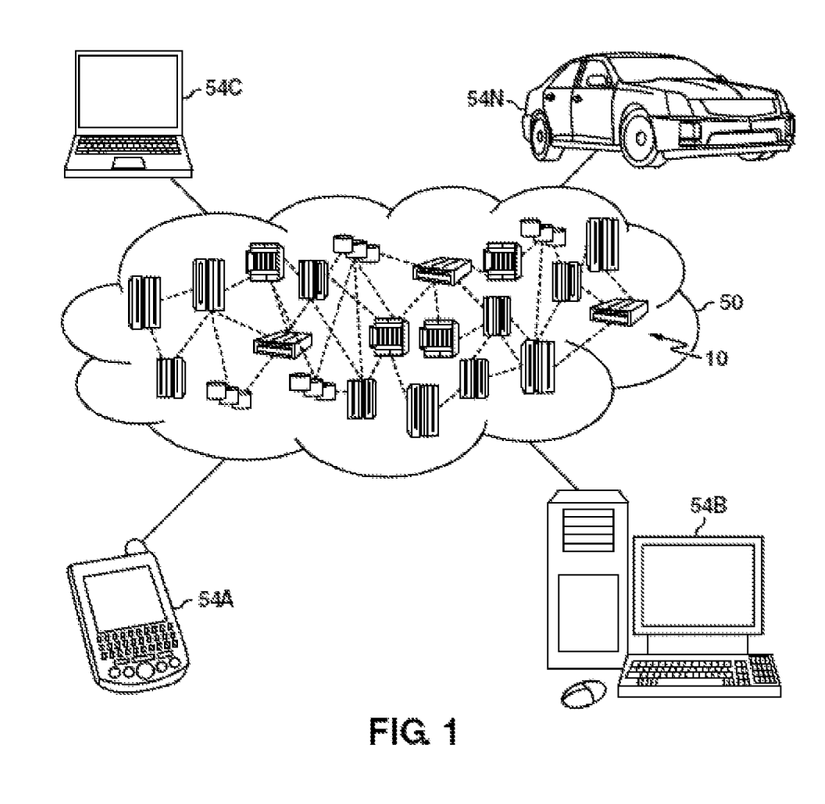
FIG. 1 depicts a cloud computing environment according to one or more embodiments of the present invention.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile onboard computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
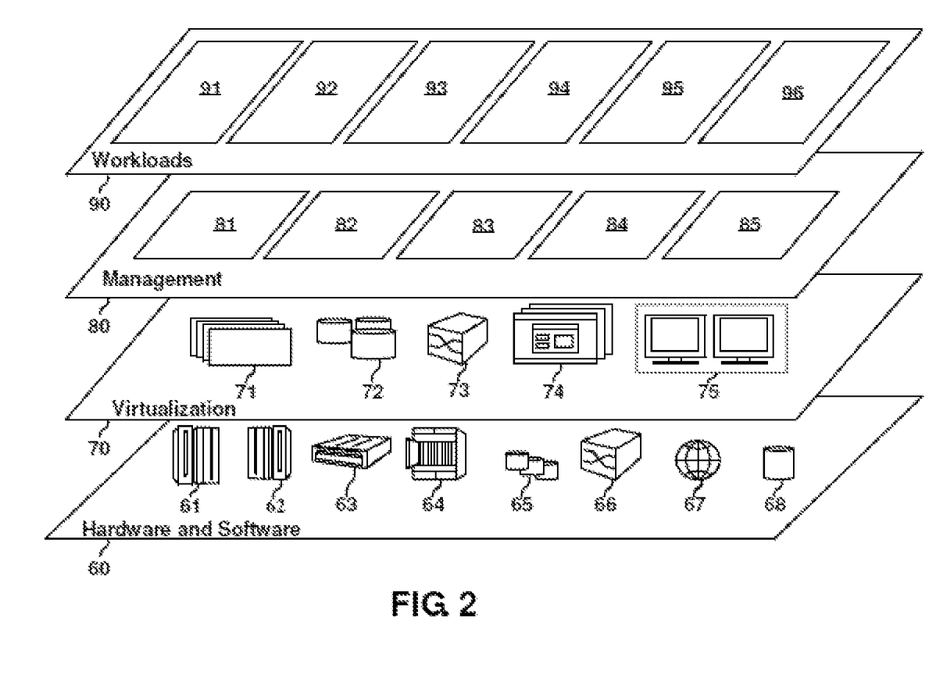
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of the aspects of the invention, one or more embodiments of the present invention provides an autonomous vehicles an ability to use an altered set of regulations in light of events affecting the autonomous vehicles, upon request by an occupant of the autonomous vehicle or by the autonomous vehicle itself in light of sensing or detecting events that could affect the autonomous vehicle. The request would be sent to a governing authority responsible for a portion/region of a road network relevant to the request, and the governing authority can determine whether the request should be granted, denied or modified based on the circumstances for the request and an associated condition of the relevant portion/region of the road network. For example, a passenger in an autonomous vehicle having a medical issue can indicate a medical emergency by contacting governing authority with a request to use altered traffic rules. The request can indicate a desire to exceed a posted speed limit for an associated portion of the road network being traversed by the autonomous vehicle in order to travel to a hospital. The governing authority can review the request and grant, deny or modify the request. Accordingly, if the governing authority grants the request, the governing authority can transmit approval of the request to the autonomous vehicle, and the autonomous vehicle can travel at the requested speed.

The above-described aspects of the invention address the shortcomings of the prior art by allowing an autonomous vehicle to temporarily disregard normal traffic rules upon request in light of an event affecting the autonomous vehicle. The request can be reviewed by a governing authority responsible for oversight of the traffic rules for a location associated with the request, and the governing authority can grant, deny or modify the request.

Figure 3:
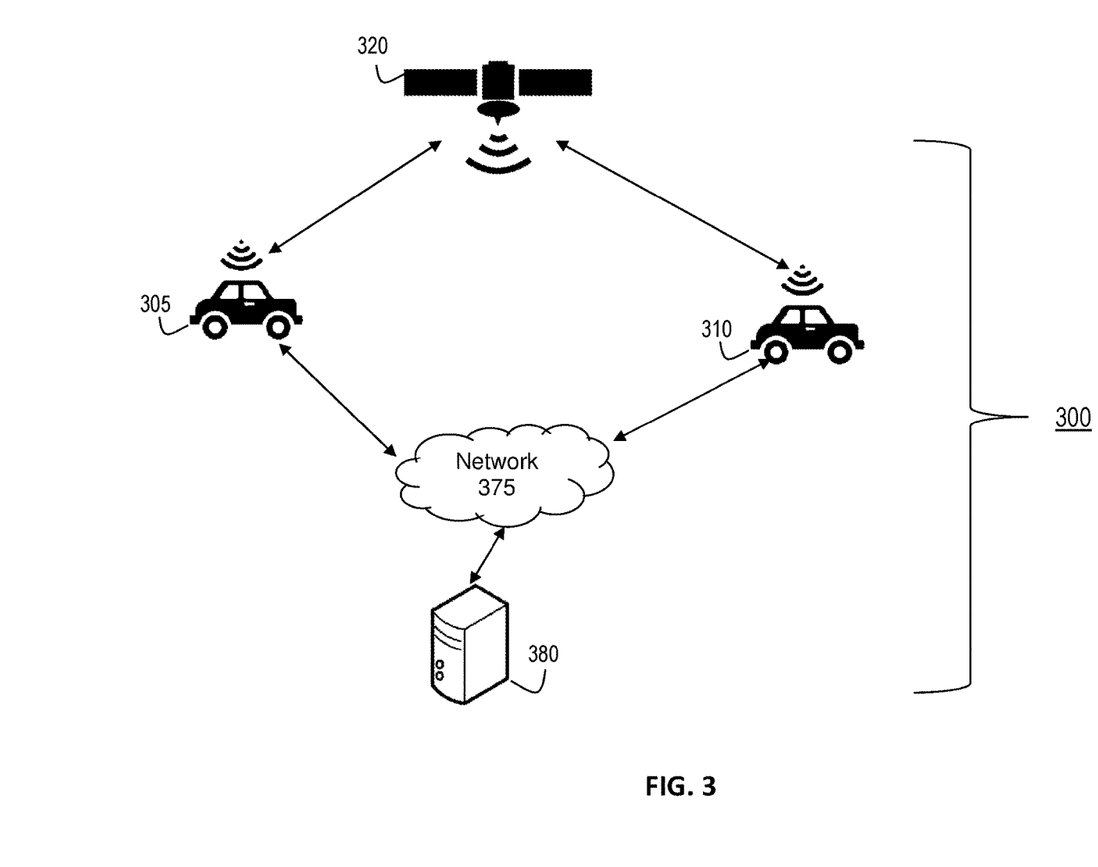
FIG. 3 is a diagram illustrating an exemplary operating environment according to one or more embodiments of the present invention.

In an exemplary embodiment of the present invention, as shown in FIG. 3, is a block diagram illustrating an exemplary operating environment 300 for an autonomous vehicle in accordance with one or more embodiments of the present invention. Environment 300 includes vehicles 305 and 310 and server 380, all interconnected over network 375. Network 375 can be, for example, a local area network (LAN), a wide area network (WAN), such as the Internet, a dedicated short range communications network, or any combination thereof, and may include wired, wireless, fiber optic, or any other connection known in the art. The communication network can be any combination of connections and protocols that will support communication between vehicle 305, vehicle 310, and server 380, respectively. Environment 300 can also include a plurality of global positioning satellites (GPS) 320 that transmit signals to the vehicles 305 and 310. The cloud computing system 50 shown in FIG. 1 can supplement or implement any of the computer-based functionality of the environment 300.

Figure 5:
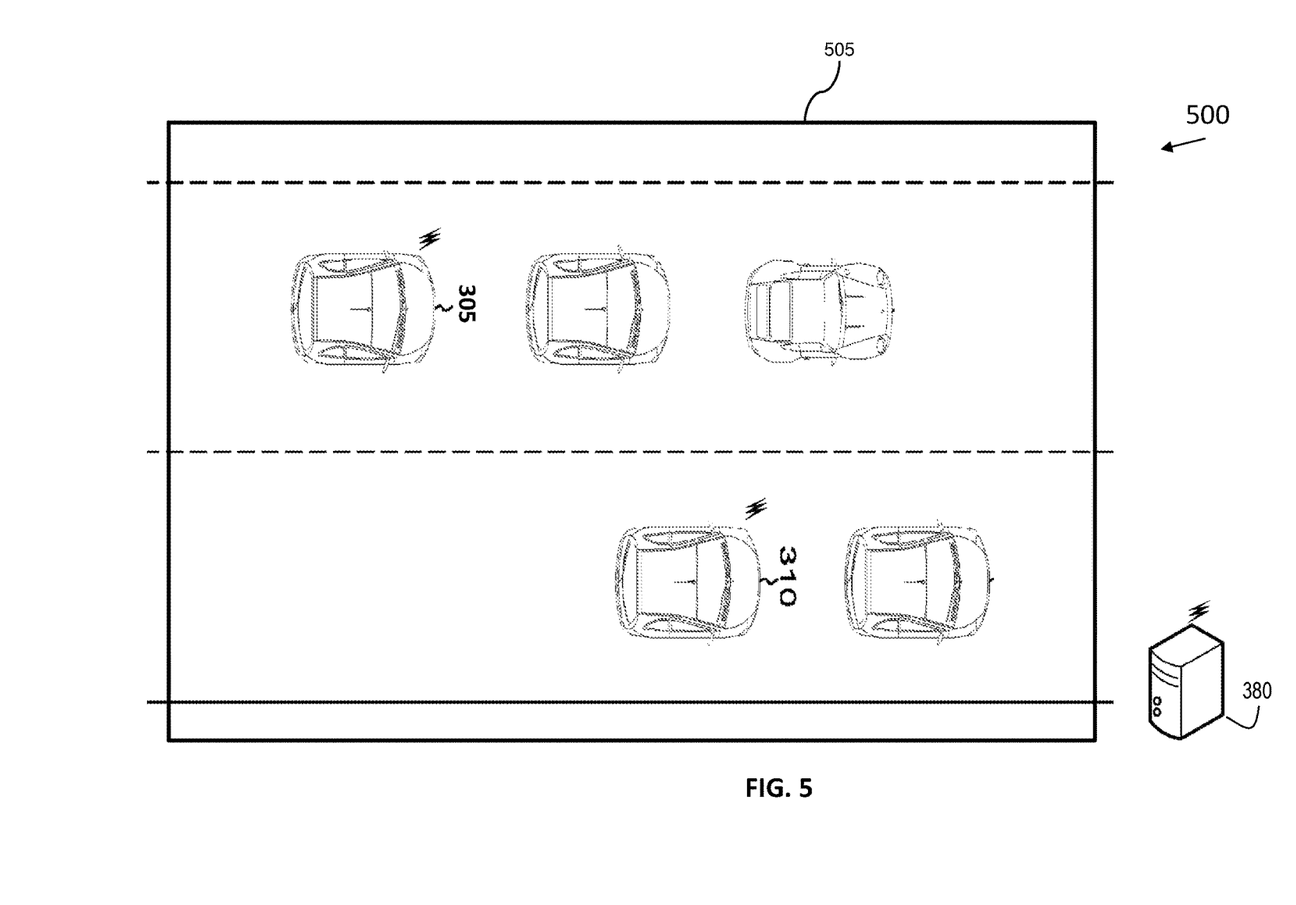
FIG. 5 is a diagram illustrating an exemplary driving environment according to one or more embodiments of the present invention.

The vehicles 305 and 310 can be motorized vehicles operating on a road network within a defined portion/region 505 (see FIG. 5). The portion/region 505 can be managed by one or more regional bodies that enforce traffic regulations within the portion/region 505. The vehicles 305 and 310 can be autonomous, semi-autonomous, partially manually operated or a combination thereof. The vehicles 305 and 310 can each include propulsion systems (not shown), control systems (not shown), user interfaces (not shown), automobile onboard computer systems 54N (see FIG. 1), sensor systems (not shown), and communications systems (not shown).

The propulsion systems can include components operable to provide powered motion to the vehicles. The propulsion systems can provide motion using a variety of sources, for example, an engine/motor. The engine/motor can be any combination of an internal combustion engine, an electric motor, or other types of engines/motors. The propulsion systems can include multiple types of engines and/or motors, such as, a gas-electric hybrid car. An energy source for the propulsion systems can be, for example, gasoline, diesel, other petroleum-based fuels, propane, hydrogen, other compressed gas-based fuels, ethanol, solar panels, and/or batteries.

The control systems include a variety of mechanical, electro-mechanical, and electronic systems that can be configured to control the operations of the vehicles. Control systems can each include a steering unit, a throttle, a brake unit, and/or a navigation system. The steering unit can be a mechanism that can control a heading and/or turning of the vehicles. The throttle can be configured to control an operating speed of the vehicles. The brake unit can include any combination of mechanisms configured to decelerate the vehicles. The navigation system can be any system configured to determine a driving path for the vehicles. For example, the navigation system can receive input information from a GPS system 320 and one or more camera systems included in the sensor systems in order to generate the driving path for the vehicles.

The user interfaces can be mechanisms by which an occupant of the vehicles can interact with the vehicles. The user interfaces can include buttons, knobs, levers, pedals, paddles, and/or any other type of user interface, such as a touchscreen display capable of detecting the location and/or movement of a user's finger.

The automobile onboard computer systems 54N, depicted in FIG. 1, are computing systems including at least one computer processor, which is capable of controlling one or more functions of the vehicles. For example, an automobile onboard computer system 54N can control a propulsion system based on inputs received from a sensor system.

The sensor systems can include any number of sensors configured to detect information about the vehicles and the vehicles' surrounding environments. The sensor systems can include a GPS, an inertial measurement unit (IMU), a RADAR unit, a LIDAR unit, and/or a camera. The GPS can be any sensor configured to estimate a geographic location. The IMU can be any combination of sensors configured to sense position and orientation changes in a vehicle based on inertial acceleration. The RADAR unit can be any system that uses radio signals to sense objects within the local environment of a vehicle. The RADAR unit can also detect relative motion between a vehicle and the vehicle's surroundings. The LIDAR unit can be any system configured to sense objects in a vehicle's environment using one or more lasers. The camera can include one or more devices configured to capture a plurality of images of the environment of a vehicle.

The communications systems can be any system configured to communicate with one or more devices directly or via network 375. The communications systems can include a transmitter and a receiver for sending and receiving messages.

The server 380 can be a desktop computer, a laptop computer, a tablet computer, a specialized computer server, a smartphone, or any other computer system known in the art. Exemplary components of server 380 are described in greater detail with regard to FIG. 4. Server 380 can include a memory storage. The memory storage can store regional laws file and regional operating mode file and an altered traffic regulations program.

Figure 4:
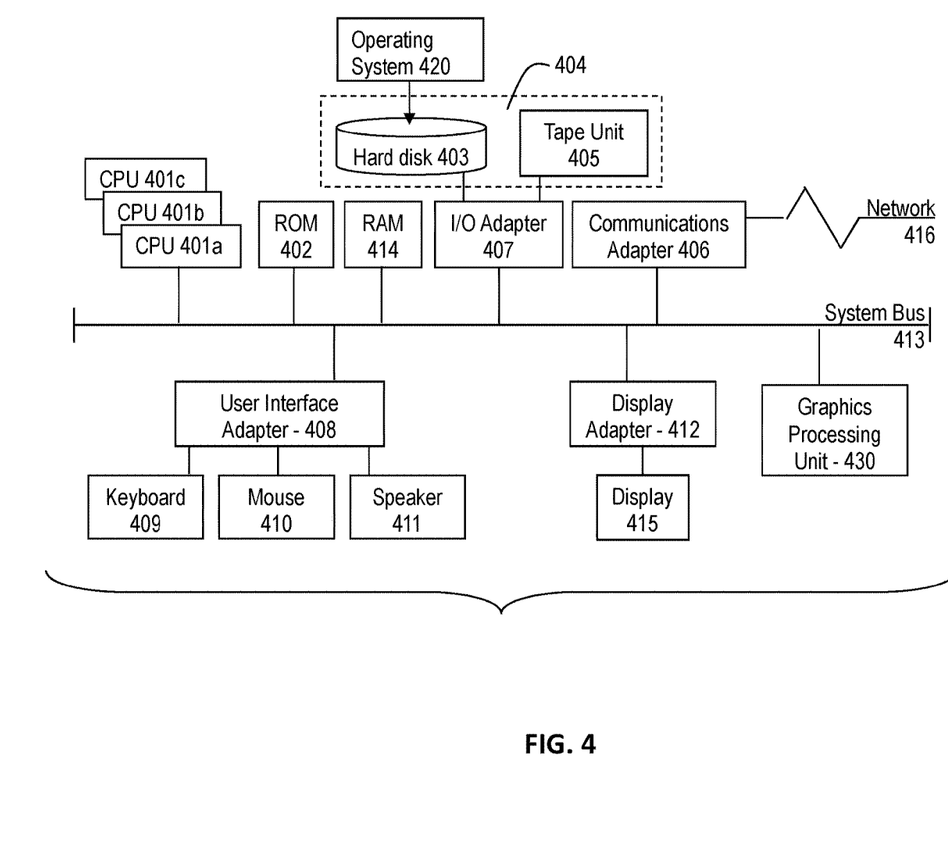
FIG. 4 is a block diagram illustrating one example of a processing system for practice of the teachings herein.

Referring to FIG. 4, there is shown exemplary components of server 380 according to one or more embodiments of the present invention. Exemplary components of server 380 can comprise processing system 400. The processing system 400 can include one or more central processing units (processors) 401a, 401b, 401c, etc. (collectively or generically referred to as processor(s) 401). In one or more embodiments, each processor 401 may include a reduced instruction set computer (RISC) microprocessor. Processors 401 are coupled to system memory 414 and various other components via a system bus 413. Read only memory (ROM) 402 is coupled to the system bus 413 and may include a basic input/output system (BIOS), which controls certain basic functions of processing system 400.

FIG. 4 further depicts an input/output (I/O) adapter 407 and a network adapter 406 coupled to the system bus 413. I/O adapter 407 may be a small computer system interface (SCSI) adapter that communicates with a hard disk 403 and/or tape storage drive 405 or any other similar component. I/O adapter 407, hard disk 403, and tape storage device 405 are collectively referred to herein as mass storage 404. Operating system 420 for execution on the processing system 400 may be stored in mass storage 404. A network adapter 406 interconnects bus 413 with an outside network, for example, network 375, enabling data processing system 400 to communicate with other such systems, for example, automobile onboard computer system 54N. A screen (e.g., a display monitor) 415 is connected to system bus 413 by display adaptor 412, which may include a graphics adapter to improve the performance of graphics intensive applications and a video controller. In one or more embodiments of the present invention, adapters 407, 406, and 412 may be connected to one or more I/O busses that are connected to system bus 413 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 413 via user interface adapter 408 and display adapter 412. A keyboard 409, mouse 410, and speaker 411 all interconnected to bus 413 via user interface adapter 408, which may include, for example, a Super I/O chip integrating multiple device adapters into a single integrated circuit.

In exemplary embodiments, the processing system 400 includes a graphics processing unit 430. Graphics processing unit 430 is a specialized electronic circuit designed to manipulate and alter memory to accelerate the creation of images in a frame buffer intended for output to a display. In general, graphics processing unit 430 is very efficient at manipulating computer graphics and image processing and has a highly parallel structure that makes it more effective than general-purpose CPUs for algorithms where processing of large blocks of data is done in parallel.

Thus, as configured in FIG. 4, the processing system 400 includes processing capability in the form of processors 401, storage capability including system memory 414 and mass storage 404, input means such as keyboard 409 and mouse 410, and output capability including speaker 411 and display 415. In one embodiment, a portion of system memory 414 and mass storage 404 collectively store an operating system coordinate the functions of the various components shown in FIG. 4.

Referring now to FIG. 5, an exemplary driving environment 500 according to one or more embodiments of the present invention is depicted. The driving environment 500 can include one or more autonomous vehicles, for example, vehicles 305, 310, driving within a region/portion 505 of a road network. The portion/region 505 can include a road network within a city, a local highway, a state road, an interstate highway, or the like. The movement of the autonomous vehicles within the portion/region 505 may be governed by traffic rules, laws, regulations, modes of operation, or the like, which can be stored on a server, for example server 380. Different entities can dictate how an autonomous vehicle operates within the portion/region 505 depending on who is responsible for the portion/region 505 of the road network being traversed by the autonomous vehicle. For example, a city can have authority for enforcing traffic rules, laws, regulations, modes of operation for traversing surface streets within the city, while a county, state or federal government entity can have authority for enforcing traffic rules, laws, regulations, modes of operation on an associated highway.

Each entity can operate a server 380. In order to manage roads and portions of a road network within the portion/region 505 in which an entity is responsible, each entity can store data associated with a set of regional rules, law, regulations (rules) and a regional operating mode on the server 380, for example, in mass storage 404. The stored regional rules can include traffic laws, including speed limits, passing rules, ability to turn at a red light, yielding right of way or any other standard necessary for safe transit along a road network within the portion/region 505. The regional operating mode can include rules that control the movement and/or operation of an autonomous vehicle within the portion/region 505. For example, a regional operating mode can include rules regarding proper spacing between cars to ensure sufficient time to stop, proper timing and use of turn signals, or any other instruction that can ensure a proper administration and operation of the autonomous vehicle within the portion/region 505.

Each entity server 380 can also store data related to altered traffic regulations program containing rules regarding how and when an associated set of regional rules can be altered upon request from one or more autonomous vehicles (altered traffic regulations) in mass storage 404. The altered traffic regulations can be employed in situations in which the autonomous vehicles need to deviate from operating within the confines of the normal traffic rules. For example, the altered traffic regulations can be applicable to one or more of the following events: a medical emergency (within the autonomous vehicle or based on another vehicle), urgent cargo being shipped within portion/region 505, a very important person traveling within the portion/region 505 (i.e., US President), weather emergency, local or national emergency, or the like. The autonomous vehicle can utilize the altered traffic regulations upon request from an occupant of the autonomous vehicle, the autonomous vehicle itself or based on instruction from a manager of the server 380.

When the autonomous vehicle transmits a data request to use altered traffic regulations to an authority governing an associated portion/region 505 of a road network via a communications system, the autonomous vehicle may be required to transmit additional information with the request for review and approval by the governing authority, for example, a municipality. The additional information can include any of the following: the nature of the emergency, the identities of occupants of the autonomous vehicle, vehicle type and/or identity, vehicle capabilities, the location of the autonomous vehicle, the route and/or destination of the vehicle, or any other relevant information. The request to use altered traffic regulations and the additional information received by the governing authority can be processed by an associated server 380 of the governing authority to determine whether the request for altered traffic regulations should be granted/permitted. The server 380 of the governing authority can use the altered traffic regulations program and a rules-based system stored on the server 380 to determine whether the request for altered traffic regulations should be granted.

Altered traffic regulations can allow for an adjusted operation of the autonomous vehicle for a designated time, area, distance or the like. Altered traffic regulations can include any of the following: an altered speed that can be higher or lower than a designated speed limit for given location within the portion/region 505, an ability to use lanes on a road segment that are normally restricted from use by the autonomous vehicle at a time a request is received or transmission is issued, an ability to temporarily alter traffic signal operation at a given location within the portion/region 505, an ability to change traffic flow directions of designated lanes of a road segment, request a cleared path, or any other adjustment to road segments or intersections needed for safe passage by the autonomous vehicle.

In addition, when a request for altered traffic regulations is granted by the governing authority, in addition to transmitting data granting the request to use altered traffic regulations, the governing authority can use the associated server 380 to transmit additional information and/or assistance to the requesting autonomous vehicle. For example, an autonomous vehicle indicating a medical emergency can be sent routing information, by the governing authority through server 380, directing the autonomous vehicle to the nearest hospital. For example, an autonomous vehicle indicating a medical emergency can transmit an alert to designated emergency contacts or the governing authority can transmit the alert if the autonomous vehicle cannot send the alert.

The server 380 of the governing authority can transmit a request to an escort (police) to assist with travel of the autonomous vehicle to a requested location or inform authorities (police) in an area associated with the autonomous vehicle that the autonomous vehicle has been authorized to use altered traffic rules to prevent an unintended incident with the authorities. Depending on the request and additional information provided, the governing authority can transmit a request requiring the autonomous vehicle to provide visible and/or audible alerts to indicate the autonomous vehicle is operating under altered traffic rules. The server 380 of the governing authority can also modify a request received from an autonomous vehicle. For example, a governing authority can receive request from an autonomous vehicle to travel 65 miles per hour (mph) on a road that has a speed limit of 40 mph via the communications system. The server 380 can process the request via processor 401 and determine that the requested rate is too dangerous for a given area or too dangerous for the autonomous vehicle given the capabilities of the autonomous vehicle. Accordingly, the processor 401 can determine a safe speed above the speed limit, for example, 50 mph, and transmit instructions via server 380 and a communications system to the requesting autonomous vehicle granting operation at the safe speed instead of the requested speed.

Figure 6:
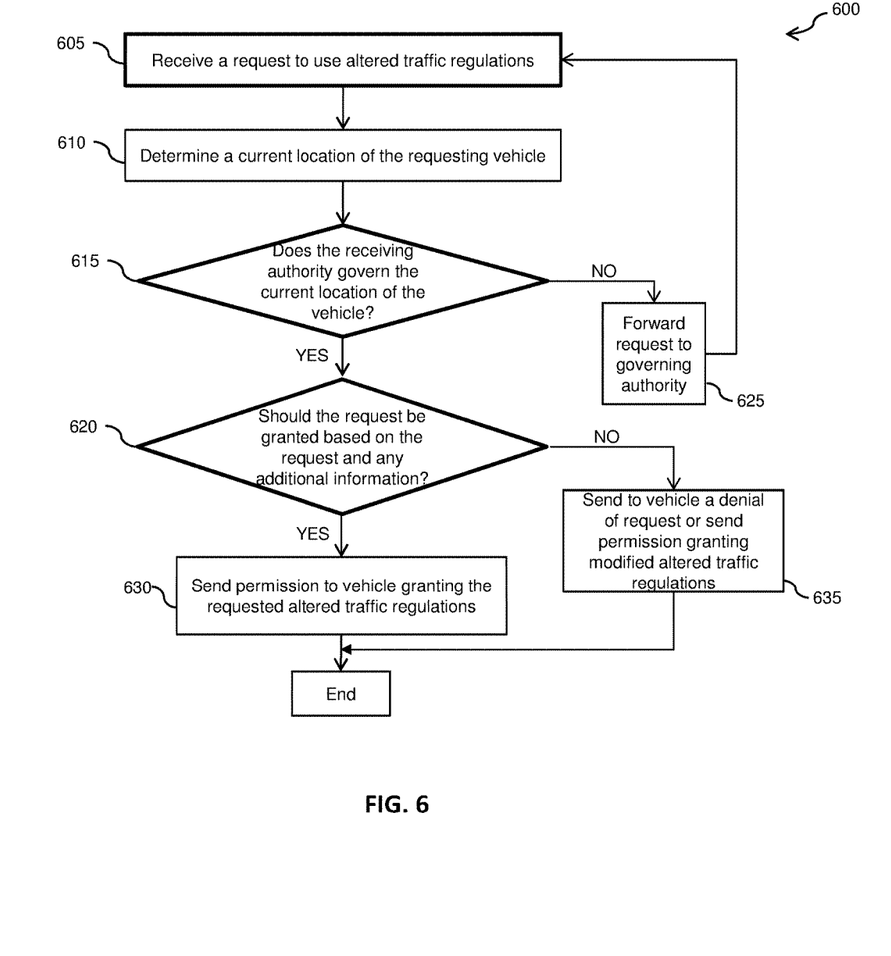
FIG. 6 is a flow diagram illustrating a method for autonomous vehicle operation using altered traffic regulations according to one or more embodiments of the present invention.

FIG. 6 is a flow diagram illustrating a method 600 for autonomous vehicle operation using altered traffic regulations according to one or more embodiments of the present invention. At block 605, a server 380 of a governing authority receives a request via a communications system to use altered traffic regulations and any associated information from one or more autonomous vehicles, for example, vehicles 310 and 315. At block 610, a processor 401 of the server 380 is used to determine a location of the requesting one or more vehicles. At block 615, the processor 401 determines that an authority in receipt of the request for the use of altered traffic regulations governs a portion/region 505 of the road network associated with the determined location of the requesting one or more autonomous vehicles. If, at block 615, the processor 401 determines that the receiving authority does not govern the portion/region 505 of the road network associated with the determined location of the requesting one or more autonomous vehicles, the method 600 proceeds to block 625 where the receiving authority forwards, using the communications system, the received request to an appropriate governing authority for portion/region 505 of the road network associated with the determined location of the requesting one or more autonomous vehicles. If, at block 615, the processor 401 determines that the receiving authority does govern the portion/region 505 of the road network associated with the determined location of the requesting one or more autonomous vehicles, the method 600 proceeds to block 620.

At block 620, the processor 401 analyzes the request to use altered traffic regulations and any associated information to determine whether the request should be granted. For example, the processor 401 may determine that the request is too dangerous to grant based on the current location and/or time for a variety of reasons, i.e., a large-scale emergency in the portion/region 505. Accordingly, at block 635, if the processor 401 determines that the request should not be granted, the sever 380 can transmit, via the communications system, a response denying the request to the one or more autonomous vehicles. The server 380 of the governing authority can also, in response to a determination by the processor 401 that the request should not be granted, transmit, via the communications system, a response modifying the request to the one or more vehicles, for example, denying a request to drive 60 mph, and transmitting, via the communications system, a modification allowing transit at 50 mph to the one or more autonomous vehicles. Accordingly, at block 630, if the processor 401 determines that the request should be granted, the server 380 can transmit, via the communications system, a response granting the request to use altered traffic regulations to the one or more autonomous vehicles. The method 600 subsequently ends. The method 600 can also be repeated as the one or more autonomous vehicles change location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for autonomous vehicle operation using altered traffic regulations, the method comprising:
   receiving, by a processor, request data that represents a request to use altered traffic regulations;
   determining, by the processor, a current location of one or more autonomous vehicles associated with the request;
   determining, by the processor, that an authority associated with the processor governs at least a portion of a road network associated with the request;
   determining a resolution, by the processor, of the request, wherein determining the resolution is based at least in part on a determination that the authority associated with the processor governs the associated portion of the road network associated with the request;
   generating resolution data representing the resolution;
   transmitting, by the processor, the resolution data; and
   granting, denying or modifying the request to use altered traffic regulations.

2. The computer-implemented method of claim 1 further comprising forwarding the request to another authority when the authority associated with the processor does not govern the associated portion of the road network associated with the request to use altered traffic regulations.

3. The computer-implemented method of claim 1, wherein the altered traffic regulations comprise an altered speed that can be higher or lower than a designated speed limit for an associated portion of the road network, an ability to use lanes on a road segment that are normally restricted from use by the autonomous vehicle at a time a request to use altered traffic regulations is received, an ability by the autonomous vehicle to temporarily alter traffic signal operation on an associated portion of the road network, an ability to change traffic flow directions of designated lanes of a road segment, or request a cleared path for the autonomous vehicle.

4. The computer-implemented method of claim 1 further comprising receiving, from the one or more autonomous vehicles, data related to information associated with at least one of the following: a nature of an emergency associated with the request to use altered traffic regulations, an identity of one or more occupants of the one or more requesting autonomous vehicles, a vehicle type and/or identity for the one or more autonomous vehicles, vehicle capabilities of the one or more autonomous vehicles, or a route and/or destination of the one or more autonomous vehicles.

5. The computer-implemented method of claim 1, wherein the altered traffic regulations are deviations from normal traffic rules for the associated portion of the road network.

6. The computer-implemented method of claim 1 further comprising notifying authorities and other vehicles traveling along the associated portion of the road network to the granting or modification of the request to use altered traffic regulations for the one or more vehicles.

7. A computer program product for autonomous vehicle operation using altered traffic regulations, the computer program product comprising:
a non-transitory computer readable storage medium having stored thereon first program instructions executable by a processor to cause the processor to:
receive request data that represents a request to use altered traffic regulations;
determine a current location of one or more autonomous vehicles associated with the request;
determine that an authority associated with the processor governs at least a portion of a road network associated with the request;
determine a resolution of the request to use altered traffic regulations, wherein the determination of the resolution is based at least in part on a determination that the authority associated with the processor governs the associated portion of the road network associated with the request to use altered traffic regulations;
generate resolution data representing the resolution; and
transmit the resolution data, wherein the resolution comprises granting, denying or modifying request to use altered traffic regulations.

8. The computer program product of claim 7, wherein the processor is further operable to forward the request to use altered traffic regulations to another authority when the authority associated with the processor does not govern the associated portion of the road network associated with the request to use altered traffic regulations.

9. The computer program product of claim 7, wherein the altered traffic regulations comprise an altered speed that can be higher or lower than a designated speed limit for an associated portion of the road network, an ability to use lanes on a road segment that are normally restricted from use by the autonomous vehicle at a time a request to use altered traffic regulations is received, an ability by the autonomous vehicle to temporarily alter traffic signal operation on an associated portion of the road network, an ability to change traffic flow directions of designated lanes of a road segment, or request a cleared path for the autonomous vehicle.

10. The computer program product of claim 7, wherein the processor is further operable to receive, from the one or more autonomous vehicles, data related to information associated with at least one of the following: a nature of an emergency associated with the request to use altered traffic regulations, an identity of one or more occupants of the one or more requesting autonomous vehicles, a vehicle type and/or identity for the one or more autonomous vehicles, vehicle capabilities of the one or more autonomous vehicles, or a route and/or destination of the one or more autonomous vehicles.

11. The computer program product of claim 7, wherein the altered traffic regulations are deviations from normal traffic rules for the associated portion of the road network.

12. The computer program product of claim 7, wherein the processor is further operable to notify authorities and other vehicles traveling along the associated portion of the road network to the granting or modification of the request to use altered traffic regulations from the one or more vehicles.

13. A system for autonomous vehicle operation using altered traffic regulations, the system comprising:
a processor;
a storage medium, the storage medium being coupled to the processor; the processor configured to:
receive request data that represents a request to use altered traffic regulations;
determine a current location of one or more autonomous vehicles associated with the request;
determine that an authority associated with the processor governs at least a portion of a road network associated with the request;
determine a resolution of the request to use altered traffic regulations, wherein the determination of the resolution is based at least in part on a determination that the authority associated with the processor governs the associated portion of the road network associated with the request to use altered traffic regulations;
generate resolution data representing the resolution; and
transmit the resolution data, wherein the resolution comprises granting, denying or modifying request to use altered traffic regulations.

14. The system of claim 13, wherein the processor is further operable to forward the request to use altered traffic regulations to another authority when the authority associated with the processor does not govern the associated portion of the road network associated with the request to use altered traffic regulations.

15. The system of claim 13, wherein the processor is further operable to receive, from the one or more autonomous vehicles, data related to information associated with at least one of the following: a nature of an emergency associated with the request to use altered traffic regulations, an identity of one or more occupants of the one or more requesting autonomous vehicles, a vehicle type and/or identity for the one or more autonomous vehicles, vehicle capabilities of the one or more autonomous vehicles, or a route and/or destination of the one or more autonomous vehicles.

16. The system of claim 13, wherein the altered traffic regulations comprise an altered speed that can be higher or lower than a designated speed limit for an associated portion of the road network, an ability to use lanes on a road segment that are normally restricted from use by the autonomous vehicle at a time a request to use altered traffic regulations is received, an ability by the autonomous vehicle to temporarily alter traffic signal operation on an associated portion of the road network, an ability to change traffic flow directions of designated lanes of a road segment, or request a cleared path for the autonomous vehicle.

17. The system of claim 13, wherein the processor is further operable to notify authorities and other vehicles traveling along the associated portion of the road network to the granting or modification of the request to use altered traffic regulations from the one or more vehicles.

* * * * *